Aug. 28, 1945.　　　C. B. HEMMING　　　2,383,548
COATING COMPOSITION
Filed April 21, 1942
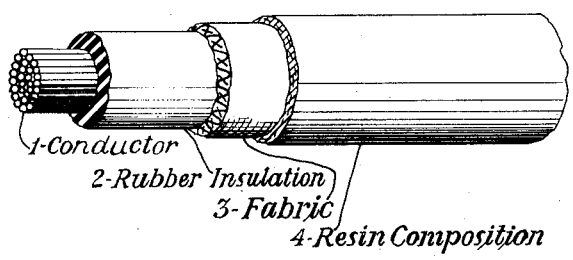
1-Conductor
2-Rubber Insulation
3-Fabric
4-Resin Composition
INVENTOR.
Charles B. Hemming
BY
Frank C. Hilberg　　ATTORNEY Patented Aug. 28, 1945

2,383,548

UNITED STATES PATENT OFFICE 2,383,548

COATING COMPOSITION

Charles B. Hemming, New Rochelle, N. Y., assignor to E. I. du Pont de Nemours & Company, Wilmington, Del., a corporation of Delaware Application April 21, 1942, Serial No. 439,939

1 Claim. (Cl. 260—15)

This invention relates to new and improved coating compositions and more particularly to compositions adapted for coating insulated electric cables.

The requirements for a commercially acceptable cable lacquer are quite severe, particularly in the case of high tension cable lacquers which in service are often exposed to high temperatures and hot lubricating oils. Lacquers containing cellulose nitrate, cellulose acetate and more recently ethyl cellulose have been widely employed on a commercial scale for coating insulated electric cables, but the desired resistance to high temperatures and hot oils has not heretofore been attained. The present invention, however, eliminates the deficiencies of presently available electric cable coatings and provides a product that is vastly superior in meeting the stringent requirements necessarily imposed by normal service of much high tension cable.

The primary object of the invention, therefore, is the provision of a composition particularly adapted for coating electric cables which will withstand high temperatures and hot lubricating oils for extended periods of time. Another object is the provision of an electric cable coating composition which will afford a tough, durable, flexible and insulating film. A further object of the invention is the provision of an improved electric cable, which by virtue of the superior properties afforded by the superposed coating, far surpasses products of this nature hitherto available. A further object is the provision of a coating composition which is quite inert and which does not decompose even at elevated temperatures to form decomposition products which deleteriously affect organic electric insulation. A still further object is the provision of a coating composition which will effectively withstand low temperatures without cracking and which is highly resistant to ozone. Other objects will appear as the description of the invention proceeds.

These and other objects are accomplished by means of a coating composition comprising essentially ethyl cellulose, preferably of 43.5–44.5% ethoxyl content, a non-drying vegetable oil modified polyhydric alcohol-dicarboxylic aliphatic acid resin in which the dicarboxylic acid has at least 6 carbon atoms in a straight chain and a urea-aldehyde type resin.

The single figure is a diagrammatic plan view of an electric cable prepared according to the present invention. In the figure, 1 represents a conventional conductor, next to which is rubber or other insulation shown as 2. The rubber insulation has a braid or other suitable fabric coating shown as 3. This fabric coating is provided with a resin composition more fully described in the following example and is shown as 4. The arrangement of the insulation other than the resin composition is not per se part of the present invention since the resin composition may be applied directly to the conductor or to the rubber and either the fabric or rubber insulation may be omitted. The drawing is diagrammatic and is not drawn to scale.

The following example is given by way of illustration only and no limitations are intended thereby except as indicated in the appended claims:

Example 1

| | Per cent by weight |
|---|---|
| Ethyl cellulose[1] | 10.6 |
| Ethyl alcohol (denatured) | 12.0 |
| Benzol | 46.0 |
| Synthetic resin solution A | 21.4 |
| Butyl stearate | 2.1 |
| Heavy mineral oil | 1.7 |
| Nigrosine oleate | 0.9 |
| Synthetic resin solution B | 5.3 |
| | 100.0 |

[1] The ethyl cellulose used in this example had an ethoxyl content of 43.5–44.5% and was characterized by a viscosity of 110 cp. of a 5% solution of the material in a 70/30 mixture of toluene and ethyl alcohol.

Synthetic resin solution A consisted of a 60% solution in toluene of an 82% castor oil modified glycerol sebacate.

Synthetic resin solution B consisted of a 60% solution in butyl alcohol of a butyl alcohol modified urea-formaldehyde resin such as described in Edgar et al. U. S. 2,191,957.

Ten coats of the composition of this example were applied by conventional gasket dip method to cotton braid insulated high tension electric cable and after aging for one week, the coated cable was subjected to the following stringent tests:

*Heat resistance.*—After exposure to a temperature of 375° F. for 16 hours, no blistering was apparent.

*Prolonged heat test.*—After exposure to a temperature of 300° F. for 120 hours, no blistering in the coating was noted and when the coated cable was twisted around a ½ inch mandrel, no cracking occurred in the coating.

*Cold-crack resistance.*—A sample of the coated cable was subjected to 130° F. for 24 hours and then to 0° F. for 16 hours. No cracking of the coating was observed when the cable was twisted around a 2 inch mandrel.

*Oil resistance.*—No cracking or penetration of oil through the coating was noted on a sample of the new cable immersed in mineral oil at 200° F. for 48 hours.

*Water resistance.*—Water absorption was less than 2% by weight when a sample of the new cable was immersed in distilled water at 72° F. for 24 hours.

When other types of synthetic resins including phenolic, vinyl and melamine resins were substituted directly for the modified urea-formaldehyde resin shown in the example and the resulting compositions applied to high tension electric cable, failure in one or more of the required tests described above invariably resulted.

Other urea-aldehyde resins can be substituted to give moderate improvements over previously available cable coatings but the aliphatic monohydric alcohol modified urea-formaldehyde resins described in the aforementioned Edgar et al. patent and similar dimethylol urea resins, afford particularly superior properties and are, therefore, preferred in the compositions of the present invention.

The particular type of ethyl cellulose shown in the example, that is, ethyl cellulose with an ethoxyl content of 43.5–44.5%, is preferred because it offers additional resistance to oil and deterioration of the coating by heat, but other commercially available types of ethyl cellulose are not precluded since compositions useful for some purposes can be prepared from them also at some sacrifice in the oil and heat resistant properties.

The particular class of oil modified alkyd type resins previously described, of which the castor oil modified glycerol sebacate of the example is representative, also contributes importantly to the flexibility, heat and oil-resistant properties of the coatings and, therefore, is included as an essential component of the compositions. Other suitable resins of this type include those prepared from polyhydric alcohols such as glycol, glycerol, trimethylene glycol and polyglycerol and dicarboxylic aliphatic acids having at least 6 carbon atoms in a straight chain such as adipic, pimelic, suberic, azaleic sebacic acid and higher homologs preferably modified with a non-drying oil.

The use of butyl stearate is optional but is generally desired since it imparts added flexibility and limpness to the coating. The heavy mineral oil may likewise be omitted although its inclusion is of advantage in preventing sticking of adjacent surfaces when the coated cable is wound on reels. The function and action of this component is described more fully in U. S. Patent 2,096,443.

In the compositions of the present invention, the ethyl cellulose, polyhydric alcohol-dicarboxylic acid resin and urea-aldehyde type resin may be present in the proportion of between 10–5–1 parts by weight and 10–25–15 parts by weight, but for optimum results, these essential ingredients are preferably present in the proportion of about 10 parts of ethyl cellulose, 12 parts of polyhydric alcohol-dicarboxylic acid resin and 3 parts by weight of urea-aldehyde type resin.

The improved compositions are useful in an importantly practical way for coating any type of conventional electric cable usually consisting of a conductor covered with rubber and cotton or asbestos braid insulation, but are of particular merit for coating high tension electric cable where the requirements are unusually severe.

The compositions of the invention afford several important advantages including particularly vastly superior resistance to high temperatures, penetration by lubricating oils and to water. The new coatings are also characterized by excellent flexibility, toughness and elasticity. The compositions herein described are also resistant to ozone and will withstand low temperatures without cracking. The coatings are quite inert and do not decompose even at elevated temperatures to form decomposition products which might deleteriously affect the insulation of the cable. Consequently the cables are particularly adapted for use as high tension ignition cables in automobiles, boats, airplanes, etc.

It is apparent that many widely different embodiments of this invention may be made without departing from the spirit and scope thereof; and, therefore, it is not intended to be limited except as indicated in the appended claim.

I claim:

A flexible, highly heat and oil resistant coating of approximately the following composition:

| | Per cent by weight |
|---|---|
| Ethyl cellulose (ethoxyl content 43.5–44.5%) | 10.6 |
| Ethyl alcohol (denatured) | 12.0 |
| Benzol | 46.0 |
| 60% solution in toluene of 82% castor oil modified glycerol sebacate | 21.4 |
| Butyl stearate | 2.1 |
| Heavy mineral oil | 1.7 |
| Nigrosine oleate | 0.9 |
| 60% solution in butyl alcohol of butyl alcohol modified urea-formaldehyde resin | 5.3 |

CHARLES B. HEMMING.